G. W. HENDRICKS.
Improvement in Corn-Planters.
No. 130,220.                                    Patented Aug. 6, 1872.
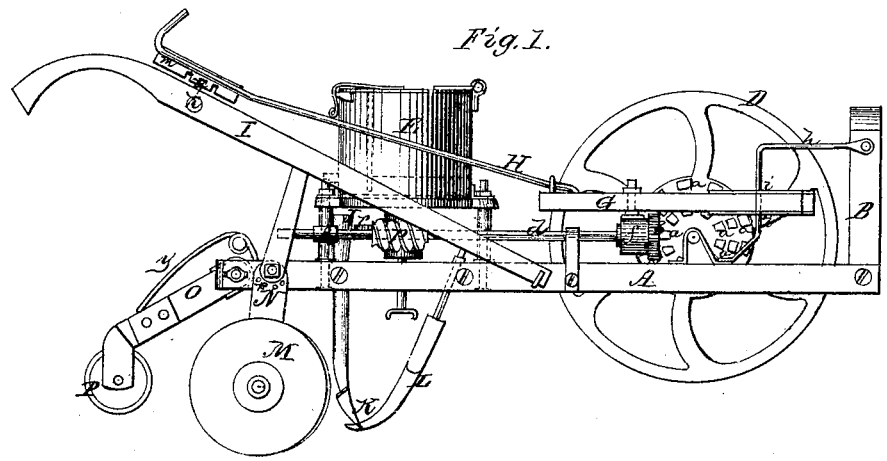
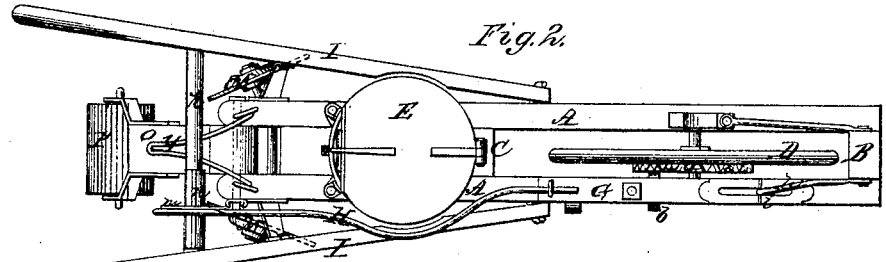
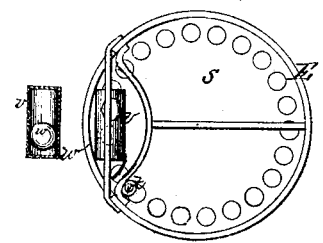

UNITED STATES PATENT OFFICE.

GEORGE W. HENDRICKS, OF RUSHVILLE, INDIANA.

IMPROVEMENT IN CORN-PLANTERS.

Specification forming part of Letters Patent No. 130,220, dated August 6, 1872.

SPECIFICATION.

*To all whom it may concern:*

Be it known that I, GEORGE W. HENDRICKS, of Rushville, in the county of Rush and State of Indiana, have invented certain new and useful Improvements in Corn-Drill; and I do hereby declare that the following is a full, clear, and exact description thereof, reference being had to the accompanying drawing and to the letters of reference marked thereon, which form a part of this specification.

The nature of my invention consists in the construction and arrangement of a corn and seed planter, as will be hereinafter more fully set forth.

In order to enable others skilled in the art to which my invention appertains to make and use the same, I will now proceed to describe its construction and operation, referring to the annexed drawing, in which—

Figure 1 represents a side elevation; Fig. 2, a plan view; and Fig. 3 is a top view of hopper.

A A represent two parallel bars, having an upright post, B, secured between their front ends and extending upward. Near the rear ends is a bar, C, filling up the space between the parallel bars A A for a certain distance, which completes the frame of my machine. At the front end, between the beams A A, is placed the driving-wheel D, the journals of which rest in suitable boxes on said beams. This wheel is on one side provided with two or more series of cogs, $a\ a$, arranged in concentric rings. These cogs are to gear with a pinion, $b$, on a shaft, $d$, to impart motion to the same, and through it to the dropping apparatus. The rear end of the shaft $d$ rests and slides in a socket, $e$, attached to one of the posts which support the seed-box E, while the front end of said shaft is passed through an eyebolt or collar, $f$, attached to the under side of a sliding bar, G. The front end of the bar G is slotted, and a brace, $h$, connecting the post B with one of the beams A, passes through the same, the bar being held at a suitable height on said brace by a pin, $i$, above, and another below the bar. To the rear end of the bar G is attached a lever or handle, H, which extends back and rests upon the round $k$ connecting the handles I I of the machine, the front ends of said handles being attached to the side bars A A. At the upper or rear end of the lever H is a notched bar, $m$, to catch on a bar, $n$, secured on the round $k$. By this device the operator is enabled at any time, while the machine is in operation, to throw the pinion $b$ in and out of gear with the cogged driving-wheel D, and also to increase or decrease the speed of the dropping or sowing mechanism. The former is done by throwing the lever H in or out on the round $k$, and the latter by pushing the same forward or backward, which moves the pinion to the inner or outer of the concentric rings or cogs $a\ a$. Upon the shaft $d$ is a worm, $p$, which gears with a cog-wheel, $r$, the lower journal of which has its bearing in the center bar C of the frame, and the upper journal passes through the center of the seed-box bottom and has a disk, $s$, attached to it within said box. The seed-box E is in form round, with the rear side pressed inward, forming, as it were, a chamber in the rear of the box.

When the machine is in motion and the shaft $d$ revolves, the disk $s$ also revolves, carrying the grain with it in a series of holes formed in or near the edge of the disk. As these holes pass out of the seed-box into the chamber in rear thereof, a brush, $t$, placed in the seed-box, cleans the disk of all superfluous grain. The grain carried by the disk then passes under a tube, $v$, placed horizontally, and open on the under side. In this tube is a loose ball, $w$, which knocks the grain from or through the hole in the disk, and causes it to fall into the conductor J, through which it passes into the furrow made by the plow K attached to or formed upon the lower end of the conductor. From the point of the plow K a colter, L, extends forward and upward, as shown, to cut any roots, &c., that may be in the way of the plow. On each side of the frame, in rear of the plow K, is a wheel, M, placed in an inclined or angular position on a stud projecting outward from the lower end of a bar, N, the upper end of which is pivoted to the side of the frame. This upper end being pivoted allows the bar and wheel to be thrown forward or backward, as may be necessary to cover the grain. Below the pivot the bar N is provided with a series of holes, arranged on the arc of a circle, with the pivot for a center, and a pin, $x$, is fastened in the frame, upon which pin either of said holes may be passed to hold the bar and covering-wheel in the desired position. Between the rear ends of the side beams A A is pivoted a bar, O, having at its rear end a metal-bound wooden roller, P, for rolling the ground over the grain, the necessary pressure for the same being obtained by a spring, $y$, bearing on the upper surface of the bar O.

Having thus fully described my invention, what I claim as new, and desire to secure by Letters Patent, is—

1. The combination of the slotted bar G, brace $h$ with pins $i\ i$, and the collar $f$, through which the shaft $d$ passes, all substantially as and for the purpose set forth.

2. The combination of the lever H, slotted sliding bar G, brace $h$, pins $i\ i$, collar $f$, and shaft $d$, the several parts being arranged substantially as and for the purpose described.

3. The loose ball $w$, in combination with the tube $v$ and disk $s$, substantially as and for the purpose set forth.

In testimony that I claim the foregoing as my own I affix my signature in presence of two witnesses.

GEORGE W. HENDRICKS.

Witnesses:
E. M. MILLER,
JACOB A. HALL.